Patented Oct. 25, 1938

2,134,206

UNITED STATES PATENT OFFICE 2,134,206

PROCESS FOR THE FIXATION OF NITROGEN

Ovid E. Roberts, Jr., Washington, D. C.

No Drawing. Application May 1, 1935, Serial No. 19,329

8 Claims. (Cl. 204—31)

My invention relates to a process for the fixation of nitrogen. Although it is known that nitrogen and oxygen may be combined through the use of the electric arc as a source of energy, the relation of the output of oxide of nitrogen, so formed, to the current consumed, is such that the process is, under most commercial conditions, uneconomic.

I have discovered that the economic production of an oxide of nitrogen by a direct combination of the nitrogen and oxygen molecules depends, not upon one, but upon a number of factors, and, equally, upon the relation of each of these factors to one another. The major factors are: temperature energizing influence; percentage of oxide of nitrogen present; percentage of ozone present; percentage of oxygen present; percentage of nitrogen present; location of source of, and the character of, the energizing influence; and the screening and/or filtering agencies present.

Under the conditions imposed by the electric arc, but a very small part of the current expended can be said to be efficiently directed toward the combination of oxygen and nitrogen. Most of this current is directed toward the generation of high temperatures which are, if not actually inhibitive to the formation of the oxide, at least conducive to its rapid dissociation. The elimination of the high temperature factor is essential to any successful economic process; and the elimination or subjection of forces of distribution is also necessary.

I have found that it is possible to substitute a high frequency brush discharge for the electric arc to constitute what I have termed a source of energizing influence. I am fully cognizant of the fact that such a source of energy might be produced by other means, such as certain cathode rays, and preferably those emitted by electrodes of aluminum and/or chromium, and therefore do not limit myself to the high frequency brush discharge as the sole source of this required energy. Such a high frequency brush discharge may be produced by means comparable to those employed in the production of ozone.

This energizing force appears to be a ray or ray group having a wave length in the neighborhood of 1700 to 2100 angstroms, and not exceeding 2250.

I have found that when a mixture of oxygen and nitrogen in atmospheric proportions is subjected to the ionizing influence of a high frequency brush discharge, there is formed a small quantity of nitrogen tetroxide or peroxide and a larger quantity of ozone. The relative proportion of these substances so formed changes rapidly, until practically no oxide of nitrogen is produced. This I have found to be due to the fact that the ozone so formed filters or screens out the rays essential to the ionization of the nitrogen. There may be other contributing factors, but I deem this of greatest influence.

To produce the conditions optimum to the formation of the oxide of nitrogen, I find that it is desirable that the oxygen content of the gas mixture should be well below that of the oxygen-nitrogen air ratio. An oxygen content of less than 7.5 per cent is desirable. The exact upper limit of the percentage of oxygen in the gas mixture will vary with the rate at which the ozone is formed and at which it is removed. Because of its filtering action hereinbefore described, the limitation of the formation and/or accumulation of appreciable amounts of ozone in the energizing zone is essential to successful formation of the oxide of nitrogen.

In the operation of my process, I pass a mixture of oxygen and nitrogen, preferably under a super-atmospheric pressure, through a zone in which they are subjected to the influence of a high frequency brush discharge, or other source of energizing rays, preferably in the presence of a gaseous element adapted to screen out the ray or rays contributing to the ozonation of the oxygen. For this purpose the preferred element is hydrogen. The gas mixture may be such as might be produced in the course of oxygen extraction by the Linde or similar processes, or it may be otherwise produced. The oxygen in this instance is less than 7.5 per cent of the mixture. The gas mixture is kept in motion as by flowing, condensation, and/or liquefaction. The gas mixture may then be re-cycled, or, in the event that it has a sufficiently high nitrogen content, be used as a source of nitrogen, or it may be enriched with oxygen and retreated.

It will be apparent that various means may be utilized to check the excessive formation of ozone and thereby accelerate the ionization of the nitrogen essential to the formation of the oxide of nitrogen. Dilution of the oxygen-nitrogen mixture by the high nitrogen content gas resulting from the reaction is a method available under most operating conditions. I may also react such ozone with an agent such as oil or other type of substance that may be readily oxidized. Such oils as the linseed oil type, asphalt type, and certain natural hydrocarbons, e. g., methane, ethane, olefines, and petroleum, indigenous to the Mid-Continent field, are suitable.

The use of such measures will vary according to the oxygen content of the gas mixture under treatment and will be less required where the oxygen content of the mixture is low.

I fully recognize the fact that variations of the pressure under which the reaction may be conducted will directly influence the rate of reaction. As a generalization, I find that the lower the oxygen content of the gas mixture, the higher the pressures under which the reaction may be employed to advantage. I do not desire to limit my claims, therefore, to any set of pressure conditions.

It is essential, if the reaction is to proceed properly, that the oxide of nitrogen be removed as rapidly as practicable. I find that this may be best accomplished by condensation, and prefer this method to absorption, the formation of nitric or nitrous acid, or the reaction with a metallic salt, although such method is feasible. The procedure adopted may vary with the requirements of operating conditions, and, recognizing this, I do not restrict myself to any specific procedure in this instance.

I have mentioned the influence of certain filtering or screening agents in the reaction zone, and have cited the influence of ozone in filtering out the rays which energize nitrogen in formation of the oxide of nitrogen. I have found that the presence of certain gases, of which hydrogen, methane and carbon monoxide are examples, appears to have the effect of reducing the amount of ozone and increasing the formation of the oxide of nitrogen.

Whether this is an example of ray filtration or is an instance where the ozone is removed by reaction with such agents, I do not know. Some evidence would lead to the conclusion that a dual function is served. Whatever the precise explanation is, the employment of such an aid may be of real value under certain operating conditions.

I have found that molecules of certain substances appear to possess a specific property which is as much an individual characteristic of that substance as its specific gravity melting point, boiling point, refractive index, etc. This property is one by which the molecule utilizes the energy of a specific ray with the resultant effect of a high degree of excitation. This effect assumes the nature of something akin to energy transformation or accumulation. There appears, for a period, a storage of energy received with a "spill-over" or other evidence of cumulative effect. The molecule appears to be activated by a specific light ray or ray groups, molecules of other substances reacting in a like manner toward other light rays or ray groups.

The resultant effect of such excitation or energization is to induce a state conducive to combination with other molecules or to polymerization. This appears a general property shared by molecules of many substances.

It is known that each chemical element may, under suitable conditions, be caused to emit certain specific light rays characteristic of such elements. Certain rays may be found in the spectrum of more than one element but their proportion, general grouping, and arrangement are a characteristic of the element producing them. The two K-lines, for example, characterizing the spectrum of calcium, may be found in the adjacent chemical elements titanium, vanadium, and chromium, in the natural series of the elements.

It might be inferred that the simple expediency of resorting to a prism or other device for the production of a monochromatic light ray of definite frequency would suffice for the purpose indicated. I have not found this to be the case. While it might work for certain types of reactions, it is at least inferior to other types which I have encountered.

In utilizing specific rays or ray groups for energizing a desired reaction, I prefer to reenforce certain well known emissions and by the superimposition of the desired frequency upon the characteristic spectrum, gain the effect desired, rather than by limitation of the energizing source to emission of simply the frequency desired.

Where the spark or brush discharge method is used, the energizing rays employed are those emitted in the brush type of discharge. To gain the effect of a specific ray or ray group required, I may adopt one of several methods. I may select for my terminals a metal whose spectrum is characterized by a ray or ray group essential for its energizing value. For this reaction I desire light ray for energizing purposes of from 1700 to 2250 angstroms.

I have found terminals of aluminum, chromium or nickel suitable for the purpose. It is within the scope of my invention to employ one terminal of aluminum and another of a different metal. Where, as in a brush discharge, there may be a multiplicity of discharge points, I may have anodes of any number of different metals as, for example, the three indicated.

I find it possible to produce the energizing rays by means of anodes kept moistened by salt solution of the chemical elements producing rays of the desired character. If I employ this method, I may use a single metallic salt or several salts in a sufficiently moist state to keep the anode damp. For this type of terminal I prefer to use the oxide or sulphate of the metal, the spectrum of which is desired.

It is within the scope of my invention to use a modified electric arc as a source of energy, such modification being made by one of three methods. In one, I use nickel or chromium as an anode. In another method I use an anode seat made of oxide or oxides of chromium, aluminum and/or nickel.

It is also within the province of my invention to use a cored arc. Such a practice is distinct from that employed in producing the well known flaming arc in that its object may have no concern with the rays comprising that portion of the spectrum to which we are optically sensitive and which is a fundamental consideration in the flaming arc as developed.

The core of such an arc may be composed of an oxide of the desired metal or the metal itself. It may also be a mixture of the metal and oxide thereof. The core may be moulded and fixed in a carbon as required, sufficient clearance being provided for such feeding in the formation of said carbon and core materials.

One procedure that may be followed is to use approximately 4 per cent oxygen in the oxygen-nitrogen mixture at slightly above atmospheric pressure in the presence of cloths or surfaces continuously saturated with linseed oil and distributed or suspended in the reaction chamber. The oxidized oil should be removed continually and replaced by new linseed oil.

Having thus described my invention, I claim—

1. A process of nitrogen fixation including the step of subjecting a mixture of nitrogen and oxygen wherein the oxygen content of the mixture is less than 7½% to a high frequency brush discharge.

2. A process of nitrogen fixation including the steps of subjecting a mixture of nitrogen and oxygen, wherein the oxygen content is well below the oxygen-nitrogen air ratio, to a high frequency brush discharge and limiting the formation and accumulation of appreciable amounts of ozone in the energizing zone.

3. The process set forth in claim 2 carried out under superatmospheric pressure.

4. The process set forth in claim 2 carried out in the presence of a gaseous agent of the group consisting of hydrogen, methane and carbon monoxide.

5. The process set forth in claim 2 carried out in the presence of an ozone oxidizing hydrocarbon.

6. The process of nitrogen fixation comprising the steps of subjecting a mixture of nitrogen and oxygen, wherein the oxygen content is less than 7½% of the mixture, to a high frequency brush discharge to produce oxides of nitrogen, separating said oxides and recirculating the low oxygen content mixture.

7. A process of nitrogen fixation which comprises, introducing a potentially reactive mixture of oxygen and nitrogen into a reaction zone, definitely limiting the oxygen of the mixture to less than substantially 7½ per cent., and effecting a reaction between the components of the mixture by irradiating the mixture in said zone with electromagnetic energy, such energy comprising essentially a ray group of from 1750 to 2250 angstroms.

8. A process of nitrogen fixation which comprises, introducing a potentially reactive mixture of oxygen and nitrogen into a reaction zone, definitely limiting the oxygen content of the mixture to less than 7½ per cent., and effecting a reaction between the components of the mixture by irradiating the mixture in said zone with electromagnetic energy comprising essentially a ray group of from 1750 to 2250 angstroms and limiting the formation and accumulation of appreciable amounts of ozone in the reaction zone.

OVID E. ROBERTS, Jr.